United States Patent

Smith

[15] 3,641,741
[45] Feb. 15, 1972

[54] EMULSION TREATER HAVING INFRARED HEATING UNITS

[72] Inventor: Grant M. Smith, 112 Rancho Rd., Roswell, N. Mex. 58201

[22] Filed: June 9, 1970

[21] Appl. No.: 44,689

[52] U.S. Cl. .................................. 55/175, 219/312, 219/354
[51] Int. Cl. ........................................................ B01d 19/00
[58] Field of Search ............... 55/45, 86, 175, 195, 208, 267; 204/157, 162; 219/310–312, 347, 354; 250/43

[56] References Cited

UNITED STATES PATENTS

| | | | |
|---|---|---|---|
| 2,448,183 | 8/1948 | Koppel | 219/311 |
| 2,844,699 | 7/1958 | Miskella | 219/347 |
| 2,954,826 | 10/1960 | Sievers | 219/354 |
| 2,956,146 | 10/1960 | Weinman | 219/311 |
| 3,134,897 | 5/1964 | Maury | 219/347 |
| 3,204,085 | 8/1965 | Busby, Sr. | 219/354 X |

Primary Examiner—Reuben Friedman
Assistant Examiner—R. W. Burks

[57] ABSTRACT

A longitudinally vertical emulsion treater having an oil-gas separator, mist eliminator, baffles, U-tube furnace and to which infrared heating units have been secured around the lower sides, the bottom and in the U-tube furnace.

4 Claims, 2 Drawing Figures

PATENTED FEB 15 1972

3,641,741

INVENTOR
GRANT M. SMITH

EMULSION TREATER HAVING INFRARED HEATING UNITS

This invention relates to emulsion treaters, the aforesaid emulsion treaters being apparatus used in the oil industry for treating crude oil; more particularly, it relates to an emulsion treater to which infrared heating units have been added in order to improve the efficiency of the treater.

It is the principal object of this invention to provide an emulsion treater having infrared heating units that are more economical to operate because only the necessary parts of the treater will be heated and thus there will not be any lost heat.

Another object of this invention is to provide an emulsion treater having infrared heating units that can be replaced without opening the treater and thus greatly reduce maintenance time and cost.

Still another object of this invention is to provide an emulsion treater having infrared heating units thus eliminating the use of the furnace and stack that has to be replaced from time to time.

These basic objects and advantages, and more particular objects and advantages of this invention will be understood by referring to the following description and claims when taken in connection with the attached drawing in which:

In the two views of the attached drawing, like parts of this invention are indicated by like reference numbers.

The reference number 5 indicates this invention in its entirety.

Figure 1:
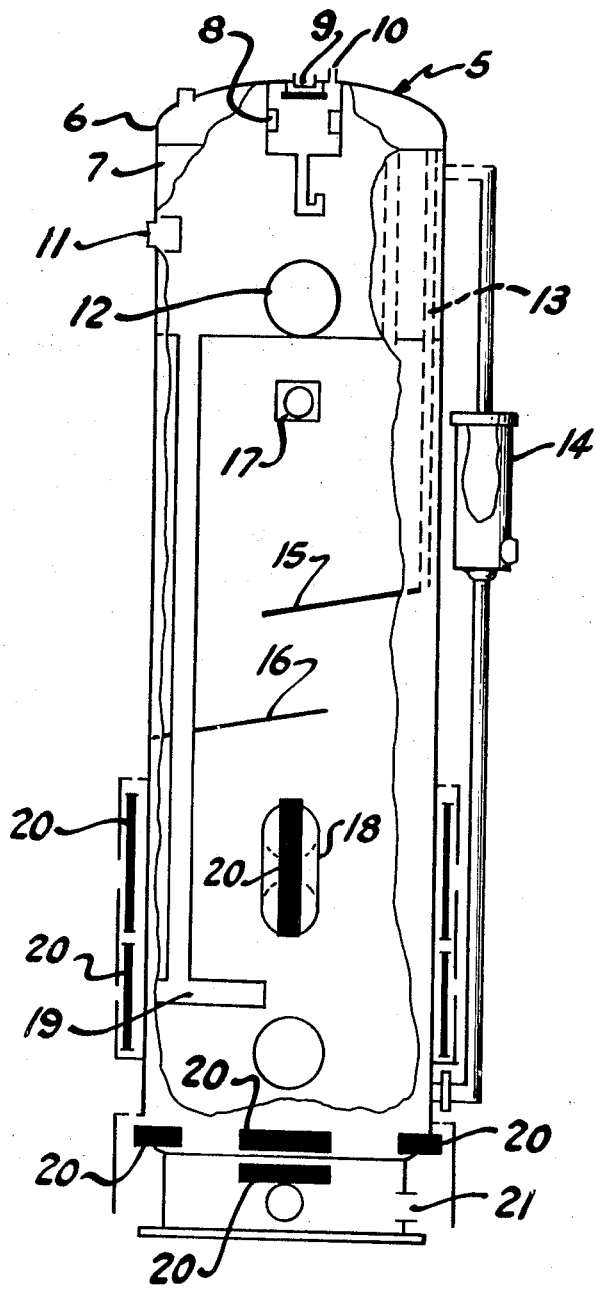
FIG. 1 is a front view of a typical emulsion treater having this invention secured thereto.
Figure 2:
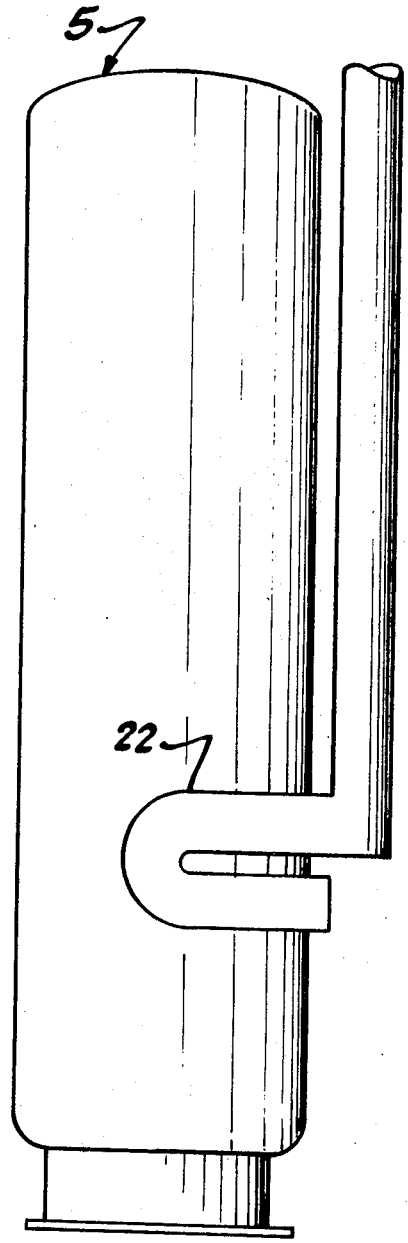
FIG. 2 is a side view of FIG. 1.

This invention 5 embodies a cylindrical tank 6 having an oil and gas separator 7 as well as a mist extractor 8 and a gas outlet 9 and gas supply 10. The invention also has an emulsion inlet 11 and a manhole 12. A degassing line 13 is located vertically inside of the aforesaid tank 6 while an adjustable weir nipple 14 is connected to the aforesaid tank by vertically disposed pipes located on the outside of the tank. Two vertically spaced vapor baffles 15 and 16 are located inside the often-mentioned tank 6 which is provided with an oil outlet 17. A U-tube furnace 18 is located under the lowermost baffle 16, while the emulsion spreader is indicated by the reference number 19. The plurality of infrared gas heaters 20, which are the crux of this invention, are clearly shown in FIG. 1 of the attached drawing. The drain 21 that is illustrated in the lower portion of FIG. 1 of the drawing, and the U-tube furnace and stack 22 are shown in FIG. 2, thus completing the construction of this invention in its basic form.

No attempt is made to illustrate or describe the detail method of securing the aforesaid infrared heaters to the emulsion treater 5 since each manufacturer's treater will require an entirely different type of attachment and this invention can be mounted on nearly any existing emulsion treater.

What I now claim as new and desire to secure by grant of Letters Patent is:

1. An emulsion treater having infrared heating units, comprising an emulsion heater to which is suitably secured a plurality of infrared gas heaters.

2. The invention of claim 1, wherein the said emulsion treater embodies a vertically disposed cylindrical tank having structure therein for the treating of crude oil, the said structure consisting in part of a gas and oil separator in the upper end of the said tank; and a mist extractor as well as a pair of baffles in vertical spaced relation to each other; and an infrared gas heater adapted to a U-tube furnace located directly under the lowermost one of the said baffles.

3. The invention of claim 2, wherein the said emulsion treater is also provided with a plurality of vertically disposed and spaced infrared gas heaters that encompass the lower end of the said tank.

4. The invention of claim 3, wherein the said emulsion treater is also provided with a plurality of horizontally disposed and spaced infrared gas heaters that encompass the lower end of the said tank below the said vertically disposed and spaced infrared gas heaters.

* * * * *